US012488228B2

(12) United States Patent
Seo et al.

(10) Patent No.: US 12,488,228 B2
(45) Date of Patent: Dec. 2, 2025

(54) PROGRAMMABLE IN-MEMORY COMPUTING ACCELERATOR FOR LOW-PRECISION DEEP NEURAL NETWORK INFERENCE

(71) Applicants: Arizona Board of Regents on behalf of Arizona State University, Scottsdale, AZ (US); The Trustees of Columbia University in the City of New York, New York, NY (US)

(72) Inventors: Jae-sun Seo, Tempe, AZ (US); Bo Zhang, New York, NY (US); Mingoo Seok, New York, NY (US); Shihui Yin, Mesa, AZ (US)

(73) Assignees: ARIZONA BOARD OF REGENTS ON BEHALF OF ARIZONA STATE UNIVERSITY, Scottsdale, AZ (US); The Trustees of Columbia University in the City of New York, New York, NY (US)

( * ) Notice: Subject to any disclaimer, the term of this patent is extended or adjusted under 35 U.S.C. 154(b) by 911 days.

(21) Appl. No.: 17/712,938

(22) Filed: Apr. 4, 2022

(65) Prior Publication Data
US 2022/0318610 A1 Oct. 6, 2022

Related U.S. Application Data

(60) Provisional application No. 63/170,432, filed on Apr. 2, 2021.

(51) Int. Cl.
*G06F 15/80* (2006.01)
*G06F 7/544* (2006.01)
(Continued)

(52) U.S. Cl.
CPC ............. *G06N 3/063* (2013.01); *G06F 7/544* (2013.01); *G06F 9/3004* (2013.01);
(Continued)

(58) Field of Classification Search
CPC .......... G06N 3/063; G06N 3/04; G06F 7/544; G06F 9/3004; G06F 9/3877; G06F 9/3885; G06F 9/3887; G06F 15/7867
See application file for complete search history.

(56) References Cited

U.S. PATENT DOCUMENTS 10,817,260 B1 * 10/2020 Huang .................... G06F 7/523
10,949,380 B2 * 3/2021 Nam ..................... G06F 9/3001
(Continued)

FOREIGN PATENT DOCUMENTS

WO WO-2020139895 A1 * 7/2020 ............. G11C 15/04

OTHER PUBLICATIONS

Kushwaha, An Energy-Efficient High CSNR XNOR and Accumulation Scheme for BNN, 2022, IEEE, pp. 2311-2315. (Year: 2022).*
(Continued)

*Primary Examiner* — Cheng Yuan Tseng
(74) *Attorney, Agent, or Firm* — Womble Bond Dickinson (US) LLP

(57) ABSTRACT

A programmable in-memory computing (IMC) accelerator for low-precision deep neural network inference, also referred to as PIMCA, is provided. Embodiments of the PIMCA integrate a large number of capacitive-coupling-based IMC static random-access memory (SRAM) macros and demonstrate large-scale integration of IMC SRAM macros. For example, a 28 nm prototype integrates 108 capacitive-coupling-based IMC SRAM macros of a total size of 3.4 megabytes (Mb), demonstrating one of the largest IMC hardware to date. In addition, a custom instruction set architecture (ISA) is developed featuring IMC and single-
(Continued)

instruction-multiple-data (SIMD) functional units with hardware loop to support a range of deep neural network (DNN) layer types. The 28 nm prototype chip achieves a peak throughput of 4.9 tera operations per second (TOPS) and system-level peak energy-efficiency of 437 TOPS per watt (TOPS/W) at 40 megahertz (MHz) with a 1 volt (V) supply.

9 Claims, 11 Drawing Sheets

(51) Int. Cl.
| | | |
|---|---|---|
| G06F 9/30 | (2018.01) | |
| G06F 9/38 | (2018.01) | |
| G06F 15/78 | (2006.01) | |
| G06N 3/04 | (2023.01) | |
| G06N 3/063 | (2023.01) | |

(52) U.S. Cl.
CPC .......... *G06F 9/3877* (2013.01); *G06F 9/3885* (2013.01); *G06F 9/3887* (2013.01); *G06F 15/7867* (2013.01); *G06N 3/04* (2013.01)

(56) References Cited

U.S. PATENT DOCUMENTS

| | | | | |
|---|---|---|---|---|
| 11,119,765 | B2* | 9/2021 | Ahmed | G06F 9/3001 |
| 11,455,770 | B2* | 9/2022 | Guo | G06T 1/20 |
| 11,507,429 | B2* | 11/2022 | Lyuh | G06N 3/048 |
| 11,948,659 | B2* | 4/2024 | Yang | G11C 11/54 |
| 11,960,855 | B2* | 4/2024 | Kwon | G06N 3/045 |
| 12,236,336 | B2* | 2/2025 | Kwon | G06F 9/3887 |
| 2020/0175355 | A1* | 6/2020 | Chung | G06F 15/8046 |
| 2022/0276835 | A1* | 9/2022 | Yang | G11C 11/412 |

OTHER PUBLICATIONS

Bankman, D. et al., "An Always-On 3.8μJ/86% CIFAR-10 Mixed-Signal Binary CNN Processor with All Memory on Chip in 28nm CMOS", 2018 IEEE International Solid-State Circuits Conference (ISSCC), Feb. 13, 2018, pp. 222-224, IEEE.

Biswas, A. et al., "CONV-SRAM: An Energy-Efficient SRAM With In-Memory Dot-Product Computation for Low-Power Convolutional Neural Networks", IEEE Journal of Solid-State Circuits, Dec. 17, 2018, pp. 217-230, vol. 54, No. 1, IEEE.

Chen, Y-H. et al., "Eyeriss: An Energy-Efficient Reconfigurable Accelerator for Deep Convolutional Neural Networks", IEEE Journal of Solid-State Circuits, Nov. 8, 2016, pp. 127-138, vol. 52, No. 1, IEEE.

Dbouk, H. et al., "KeyRAM: A 0.34 uJ/decision 18k decisions/s Recurrent Attention In-memory Processor for Keyword Spotting", 2020 IEEE Custom Integrated Circuits Conference (CICC), Mar. 22-25, 2020, 4 pages, IEEE.

Dong, Q. et al., "A 351TOPS/W and 372.4GOPS Compute-in-Memory SRAM Macro in 7nm FinFET CMOS for Machine-Learning Applications", 2020 IEEE International Solid-State Circuits Conference (ISSCC), Feb. 18, 2020, pp. 242-244, IEEE.

Gambardella, G. et al., "Efficient Error-Tolerant Quantized Neural Network Accelerators", 2019 IEEE International Symposium on Defect and Fault Tolerance in VLSI and Nanotechnology Systems (DFT), Dec. 2019, 6 pages, IEEE.

Gonugondla, S. K. et al., "A 42pJ/Decision 3.12TOPS/W Robust In-Memory Machine Learning Classifier with On-Chip Training", 2018 IEEE International Solid-State Circuits Conference (ISSCC), Feb. 14, 2018, pp. 490-492, IEEE.

Guo, R. et al., "A 5.1pJ/Neuron 127.3us/Inference RNN-based Speech Recognition Processor using 16 Computing-in-Memory SRAM Macros in 65nm CMOS", 2019 Symposium on VLSI Circuits Digest of Technical Papers, 2019, 2 pages, JSAP.

Han, S. et al., "EIE: Efficient Inference Engine on Compressed Deep Neural Network", 2016 ACM/IEEE 43rd Annual International Symposium on Computer Architecture, 2016, pp. 243-254, IEEE.

He, K. et al., "Deep Residual Learning for Image Recognition", 2016 IEEE Conference on Computer Vision and Pattern Recognition (CVPR), Jun. 27-30, 2016, pp. 770-778, IEEE.

Hubara, I. et al., "Quantized Neural Networks: Training Neural Networks with Low Precision Weights and Activations", Journal of Machine Learning Research, Apr. 2018, pp. 1-30.

Jia, H. et al., "A Programmable Heterogeneous Microprocessor Based on Bit-Scalable In-Memory Computing", IEEE Journal of Sold-State Circuits, Apr. 29, 2020, pp. 2609-2621, vol. 55, No. 9, IEEE.

Jiang, Z. et al., "XNOR-SRAM: In-Memory Computing SRAM Macro for Binary/Ternary Deep Neural Networks", 2018 Symposium on VLSI Technology Digest of Technical Papers, 2018, pp. 173-174, IEEE.

Jiang, Z. et al., "C3SRAM: An In-Memory-Computing SRAM Macro Based on Robust Capacitive Coupling Computing Mechanism," IEEE Journal of Solid-State Circuits, May 18, 2020, pp. 1888-1897, vol. 55, No. 7, IEEE.

Kang, M. et al., "An In-Memory VLSI Architecture for Convolutional Neural Networks", IEEE Journal on Emerging and Selected Topics in Circuits and Systems, Apr. 23, 2018, pp. 494-505, vol. 8, No. 3, IEEE.

Khwa, W-S. et al., "A 65nm 4Kb Algorithm-Dependent Computing-In-Memory SRAM Unit-Macro with 2.3ns and 55.8TOPS/W Fully Parallel Product-Sum Operation for Binary DNN Edge Processors", 2018 IEEE International Solid-State Circuits Conference, Feb. 14, 2018, pp. 496-498, IEEE.

Krizhevsky, A., "Learning Multiple Layers of Features from Tiny Images", Apr. 8, 2009, 60 pages, https://www.cs.toronto.edu/~kriz/learning-features-2009-TR.pdf.

Krizhevsky, A. et al., "ImageNet Classification with Deep Convolutional Neural Networks", Conference on Neural Information Processing Systems (NIPS 2012), Dec. 2012, pp. 1-9.

Rastegari, M. et al., "XNOR-Net: ImageNet Classification Using Binary Convolutional Neural Networks", 2016, pp. 525-542, Springer International Publishing AG.

Si, X. et al., "A Twin-8T SRAM Computation-in-Memory Unit-Macro for Multibit CNN-Based AI Edge Processors", IEEE Journal of Solid-State Circuits, Nov. 27, 2019, pp. 189-202, vol. 55, No. 1, IEEE.

Sim, J. et al., "An Energy-Efficient Deep Convolutional Neural Network Inference Processor With Enhanced Output Stationary Dataflow in 65-nm CMOS", IEEE Transactions on Very Large Scale Integration (VLSI) Systems, Sep. 2, 2019, pp. 87-100, vol. 28, No. 1, IEEE.

Simonyan, K. et al., "Very Deep Convolutional Networks for Large-Scale Image Recognition", Conference Paper at ICLR 2015, arXiv:1409.1556v6 [cs.CV], Apr. 10, 2015, pp. 1-14, www.arXiv.org.

Su, J-W. et al., "A 28nm 64Kb Inference-Training Two-Way Transpose Multibit 6T SRAM Compute-in-Memory Macro for AI Edge Chips", 2020 IEEE International Solid-State Circuits Conference (ISSCC), Feb. 18, 2020, pp. 240-242, IEEE.

Szegedy, C. et al., "Going Deeper with Convolutions", 2015 IEEE Conference on Computer Vision and Pattern Recognition (CVPR), Jun. 7-12, 2015, pp. 1-9, IEEE.

Valavi, H. et al., "A Mixed-Signal Binarized Convolutional-Neural-Network Accelerator Integrating Dense Weight Storage and Multiplication for Reduced Data Movement", 2018 Symposium on VLSI Circuits Digest of Technical Papers, 2018, pp. 141-142, IEEE.

Valavi, H. et al., "A 64-Tile 2.4-Mb In-Memory-Computing CNN Accelerator Employing Charge-Domain Compute", IEEE Journal of Solid-State Circuits, Mar. 5, 2019, pp. 1789-1799, vol. 54, No. 6, IEEE.

Wang, J. et al., "A Compute SRAM with Bit-Serial Integer/Floating-Point Operations for Programmable In-Memory Vector Acceleration", 2019 IEEE International Solid-State Circuits Conference (ISSCC), Feb. 19, 2019, pp. 224-226, IEEE.

(56) References Cited

OTHER PUBLICATIONS

Wu, Y. N. et al., "Accelergy: An Architecture-Level Energy Estimation Methodology for Accelerator Designs", 2019 IEEE/ACM International Conference on Computer-Aided Design (ICCAD), Nov. 4-7, 2019, 8 pages, IEEE.

Yin, S. et al., "Vesti: Energy-Efficient In-Memory Computing Accelerator for Deep Neural Networks", IEEE Transactions on Very Large Scale Integration (VLSI) Systems, Oct. 14, 2019, pp. 48-61, vol. 28, No. 1, IEEE.

Yin, S. et al., "PIMCA: A 3.4-Mb Programmable In-Memory Computing Accelerator in 28nm for On-Chip DNN Inference", 2021 Symposium on VLSI Circuits Digest of Technical Papers, 2021, pp. 1-2, JSAP.

Yin, S. et al., "XNOR-SRAM: In-Memory Computing SRAM Macro for Binary/Ternary Deep Neural Networks", IEEE Journal of Solid-State Circuits, Jan. 14, 2020, pp. 1733-1743, vol. 55, No. 6, IEEE.

Yue, J. et al., "A 65nm Computing-in-Memory-Based CNN Processor with 2.9-to- 35.8TOPS/W System Energy Efficiency Using Dynamic-Sparsity Performance-Scaling Architecture and Energy-Efficient Inter/Intra-Macro Data Reuse", 2020 IEEE International Solid-State Circuits Conference (ISSCC), Feb. 18, 2020, pp. 234-236, IEEE.

Zhang, J. et al., "In-Memory Computation of a Machine-Learning Classifier in a Standard 6T SRAM Array", IEEE Journal of Solid-State Circuits, Mar. 10, 2017, pp. 915-924, vol. 52, No. 4, IEEE.

Zhou, S. et al., "DoReFa-Net: Training Low Bitwidth Convolutional Neural Networks with Low Bitwidth Gradients", arXiv:1606.06160v2 [cs.NE], Jul. 17, 2016, pp. 1-14, www.arXiv.org.

Zimmer, B. et al., "A 0.32-128 TOPS, Scalable Multi-Chip-Module-Based Deep Neural Network Inference Accelerator With Ground-Referenced Signaling in 16 nm," IEEE Journal of Solid-State Circuits, Jan. 14, 2020, pp. 920-932, vol. 55, No. 4, IEEE.

\* cited by examiner

|  | Field Name | Width | Explanation |
|---|---|---|---|
| AM Access (30b) | AR | 10b | Read address |
|  | AW | 10b | Write address |
|  | RE | 6b | Read enable |
|  | WE | 1b | Write enable |
|  | Sel_top | 1b | Read from top group if true |
|  | MO | 2b | AM rotator output order |
| PE (17b) | PIX | 3b | PE select index |
|  | RCE | 3b | Macro array row enable |
|  | PCE | 6b | Macro array column enable |
|  | PSK | 1b | Skip PE operation if 1 |
|  | C5x5 | 1b | 5x5 conv. mode if 1 |
|  | MSB | 1b | Feeding MSB/LSB of act. if 1/0 |
|  | DUP | 2b | Empty row control in IMC |
| SIMD (14b) | OP | 3b | Operation code |
|  | Y | 3b | Operand Y |
|  | X | 3b | Operand X |
|  | Z | 3b | Destination Z of result |
|  | REN | 1b | SIMD right lane enable |
|  | LEN | 1b | SIMD left lane enable |
| Loop (6b) | RP | 6b | Repetition times of current instr. |
| Type (4b) | TP | 4b | =0xxx for PE/SIMD instr. |

*FIG. 4B*

|  | Field Name | Width | Explanation |
|---|---|---|---|
| Loop Parameter | LIN | 10b | Loop variable initial value |
|  | LST | 10b | Loop step size |
|  | LPR | 6b | Loop repeat times |
|  | LET | 10b | Loop entry address |
| Loop Variable | LIX | 3b | Destination loop variable index |
|  | LIXS | 3b | Source loop variable index |
|  | LB | 10b | Loop variable scaling factor |
|  | LC | 10b | Loop variable offset |
| Row Size | RS | 6b | For configuration instr. SRS |
| Type | TP | 4b | Opcode for loop instruction |

*FIG. 4C*

PROGRAMMABLE IN-MEMORY COMPUTING ACCELERATOR FOR LOW-PRECISION DEEP NEURAL NETWORK INFERENCE

RELATED APPLICATIONS

This application claims the benefit of provisional patent application Ser. No. 63/170,432, filed Apr. 2, 2021, the disclosure of which is hereby incorporated herein by reference in its entirety.

FIELD OF THE DISCLOSURE

The present disclosure is related to in-memory computing for machine learning.

BACKGROUND

In the era of artificial intelligence, various deep neural networks (DNNs), such as multi-layer perceptron, convolutional neural networks, and recurrent neural networks, have emerged and achieved human-level performance in many recognition tasks. These DNNs usually require billions of multiply-and-accumulate (MAC) operations, soliciting energy-efficient and high-throughput architecture innovation for on-device DNN workloads. Among a variety of solutions, in-memory computing (IMC) has widely attracted research interests, owing to high computation parallelism, reduced data communication, and energy-efficient analog accumulation for low-precision quantized DNNs. Single-macro-level or layer-level IMC designs have been recently demonstrated with high energy efficiency. However, due to the limited number of IMC macros integrated on-chip, it is difficult to evaluate system-level throughput and energy efficiency. Also, recent works hard-wired the data flow of both IMC and non-IMC operation, exhibiting limited flexibility to support layer types other than batch normalization and activation layers. Furthermore, hardware loop support is often omitted, incurring large overhead in latency and instruction counts.

SUMMARY

A programmable in-memory computing (IMC) accelerator for low-precision deep neural network inference, also referred to as PIMCA, is provided. Embodiments of the PIMCA integrate a large number of capacitive-coupling-based IMC static random-access memory (SRAM) macros and demonstrate large-scale integration of IMC SRAM macros. For example, a 28 nanometer (nm) prototype integrates 108 capacitive-coupling-based IMC SRAM macros of a total size of 3.4 megabytes (Mb), demonstrating one of the largest IMC hardware to date. In addition, a custom instruction set architecture (ISA) is developed featuring IMC and single-instruction-multiple-data (SIMD) functional units with hardware loop to support a range of deep neural network (DNN) layer types. The 28 nm prototype chip achieves a peak throughput of 4.9 tera operations per second (TOPS) and system-level peak energy-efficiency of 437 TOPS per watt (TOPS/W) at 40 megahertz (MHz) with a 1 volt (V) supply.

An exemplary embodiment provides a programmable large-scale hardware accelerator. The programmable large-scale hardware accelerator includes a plurality of IMC processing elements (PEs), each comprising a set of IMC macros which are configured to run in parallel. The plurality of IMC PEs are configured to run at least one of serially or in parallel.

Another exemplary embodiment provides a method for distributing computations of DNNs in an accelerator. The method includes mapping multiply-and-accumulate (MAC) operations to a plurality of IMC PEs and mapping non-MAC operations to an SIMD processor.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 4B illustrates the format of a regular instruction in a custom ISA for the six-stage pipeline of FIG. 4A.

FIG. 4C illustrates the format of a for-loop instruction in the custom ISA for the six-stage pipeline of FIG. 4A.

DETAILED DESCRIPTION

Figure 1:
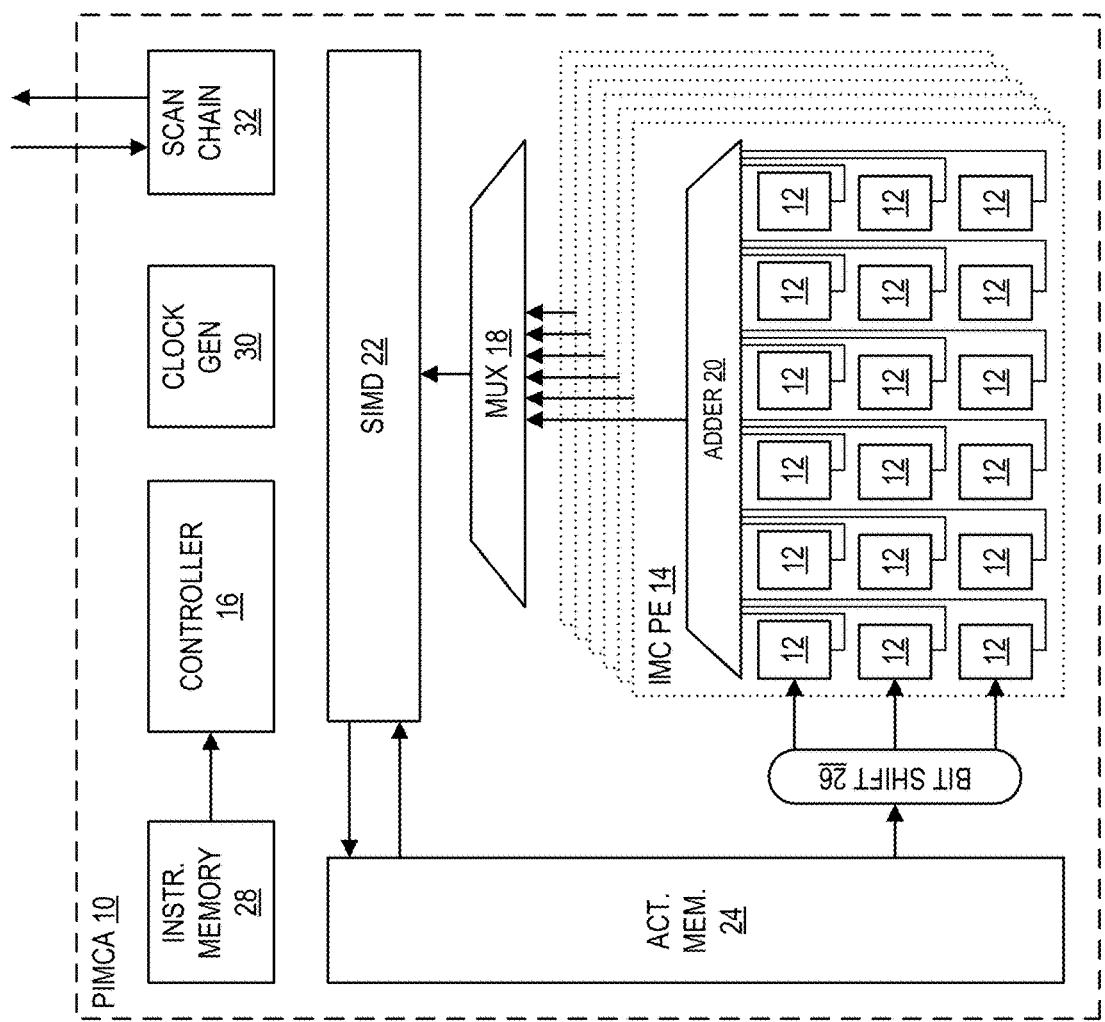
FIG. 1 is a schematic diagram of the overall architecture of a programmable in-memory computing accelerator (PIMCA) according to embodiments described herein.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

A programmable in-memory computing (IMC) accelerator for low-precision deep neural network inference, also referred to as PIMCA, is provided. Embodiments of the PIMCA integrate a large number of capacitive-coupling-based IMC static random-access memory (SRAM) macros and demonstrate large-scale integration of IMC SRAM macros. For example, a 28 nanometer (nm) prototype integrates 108 capacitive-coupling-based IMC SRAM macros of a total size of 3.4 megabytes (Mb), demonstrating one of the largest IMC hardware to date. In addition, a custom instruction set architecture (ISA) is developed featuring IMC and single-instruction-multiple-data (SIMD) functional units with hardware loop to support a range of deep neural network (DNN) layer types. The 28 nm prototype chip achieves a peak throughput of 4.9 tera operations per second (TOPS) and system-level peak energy-efficiency of 437 TOPS per watt (TOPS/W) at 40 megahertz (MHz) with a 1 volt (V) supply.

I. INTRODUCTION

Recent advances in DNN research enable artificial intelligence (AI) to achieve human-like accuracy in various recognition tasks. To further increase the recognition accuracy, the current trend is to train a bigger and deeper DNN model, and this brings challenges on fast and energy-efficient inference using such DNN models.

To tackle these challenges, a number of digital DNN hardware accelerators have been recently proposed. Compared to central processing units (CPUs) and graphical processing units (GPUs), these DNN accelerators achieve better performance and energy efficiency. However, accessing on-chip memory such as cache memories, scratch pads, and buffers remains a key bottleneck, limiting further improvement in performance and energy efficiency.

To reduce this overhead of on-chip memory access, researchers have recently proposed the IMC SRAM architecture, which aims to integrate the SRAM and arithmetic functions in a single macro. In conventional architecture, SRAM usually allows only row-by-row access, which increases cycle counts and limits energy efficiency. On the other hand, the IMC architecture allows for access and computation on all the data stored in the IMC SRAM simultaneously in one cycle. By enabling such a capability, recent works have demonstrated IMC SRAM hardware with extremely high energy efficiency and computational throughput.

However, there remain several critical challenges to designing a DNN accelerator that integrates IMC SRAM macros. First, the total capacity of IMC SRAM macros should be large enough to hold a significant portion of the weights/parameters of a DNN. Second, the accelerator should be programmable to support a wide range of DNN layers. Finally, the accelerator should efficiently support the generic nested loops inside the DNNs.

In light of these challenges, a programmable in-memory computing accelerator (referred to herein as PIMCA) is proposed which integrates 108 IMC SRAM macros (3.4 Mb) with a custom 10T1C cell in a 28 nm complementary metal oxide-semiconductor (CMOS) technology. The IMC SRAM macros can hold all the weights for a typical one-bit (1-b) VGG-9 model, avoiding any off-chip data movement during the DNN inference. For larger network models such as ResNet-18, the accelerator can execute a group of layers at a time and time-multiplex with minimum weight reloading.

In addition to these IMC SRAM macros that perform MAC computation, the PIMCA also integrates a flexible SIMD processor that supports a wide range of non-MAC operations such as average-/max-pooling, element-wise addition, residual operation, etc. As a result, the data movement energy consumption and latency between the accelerator and a host (e.g., CPU) is eliminated because the host otherwise needs to deal with these non-MAC computations.

Furthermore, a custom 6-stage pipeline and custom ISA are designed which feature hardware support for a generic loop. This saves up to 73% of the total program size as well as a great amount of cycle counts and energy consumption. The test chip prototyped in 28 nm CMOS achieves a system-level (macro-level) peak energy efficiency of 437 (588) TOPS/W and a peak throughput of 4.9 TOPS at 40 MHz.

This disclosure is organized as follows. In Section II, the architecture of this accelerator, the PIMCA, is described, along with the IMC SRAM macro circuits, the SIMD processor, and the custom ISA. The processes of several architecture and circuit design decisions are also described. Section III describes a process for distributing DNN computations in the PIMCA accelerator. The disclosure is concluded in Section IV.

II. PIMCA ARCHITECTURE AND CIRCUITS

A. Architecture Overview

FIG. 1 is a schematic diagram of the overall architecture of a PIMCA 10 according to embodiments described herein. The PIMCA 10 integrates many IMC macros 12, which may be organized in one or more IMC processing elements (PEs) 14. In some embodiments, the IMC macros 12 are SRAM macros. The IMC macros 12 in a given IMC PE 14 operate in parallel, while the IMC PEs 14 may operate in parallel or in serial (e.g., with only one IMC PE 14 active at a time). The active IMC PE 14 may be selected by a controller 16, such as by using a multiplexer 18.

The IMC PE 14 performs parallel IMC operations, such as matrix-vector multiplication (MVM). Each IMC macro 12 in the IMC PE 14 produces a partial sum, and the IMC PE 14 further includes an adder 20 to accumulate results. In some embodiments, the adder 20 incorporates an adder tree which is configurable in accordance with the operation being performed, the number of IMC macros 12 being used, and so on. The accumulated results from the adder 20 can be further processed by a SIMD processor 22 for performing various non-MAC layer operations. The SIMD processor 22 then outputs its results to activation memory 24.

The activation memory 24 refers herein to a memory array used to store operands and results of IMC operations for the PIMCA 10. In an exemplary aspect, the activation memory 24 is an SRAM array which facilitates parallel processing through simultaneous activation (e.g., for read/write operations) of multiple rows of the activation memory 24. Other memory types may also be used, such as dynamic random-access memory (DRAM) or non-volatile memory (NVM). The input to the IMC PE 14 may be connected to the activation memory 24 through bit shift circuitry 26.

The PIMCA 10 also includes instruction memory 28, which provides instructions to the controller 16. The instruction memory 28 may be an additional array of memory similar to the activation memory 24, or may be a different type of memory. The instruction memory 28 may be non-volatile or volatile memory, such as read-only memory (ROM), erasable programmable read-only memory (EPROM), electrically erasable programmable read-only memory (EEPROM), or random-access memory (RAM) (e.g., DRAM, such as synchronous DRAM (SDRAM)).

The instruction memory 28 may further store any number of program modules or other applications corresponding to programs, applications, functions, and the like that may implement the functionality described herein in whole or in part, and provide corresponding instructions to the controller 16. The controller 16 is configured to execute processing logic instructions for performing the operations and steps discussed herein. The controller 16 may represent an application-specific integrated circuit (ASIC) or other programmable logic device, a discrete gate or transistor logic, discrete hardware components, or any combination thereof designed to perform the functions described herein.

The PIMCA 10 generally includes additional operational circuitry, such as a clock generator 30 and a scan chain 32 (e.g., for interfacing with off-chip components in a computing system).

In an exemplary embodiment, the PIMCA 10 integrates 108 SRAM IMC macros 12, each of size 256×128, organized in six IMC PEs 14. In each IMC PE 14, eighteen IMC macros 12 are organized in a 3×6 array. At each cycle, at most one IMC PE 14 is activated. The active IMC PE 14 can perform MVM using between one and eighteen IMC macros 12. Each of the selected IMC macros 12 in the IMC PE 14 yields 128 4-b partial sums, which can be accumulated to 256-d 8-b results by the adder 20 (a configurable adder tree) in the IMC PE 14. The adder 20 is configured either in 256-d 9-input mode for 3×3 convolution support or 128-d 18-input mode for 5×5 convolution. The accumulation results can be further processed by a 256-way SIMD processor 22.

B. IMC Macro

Figure 2:
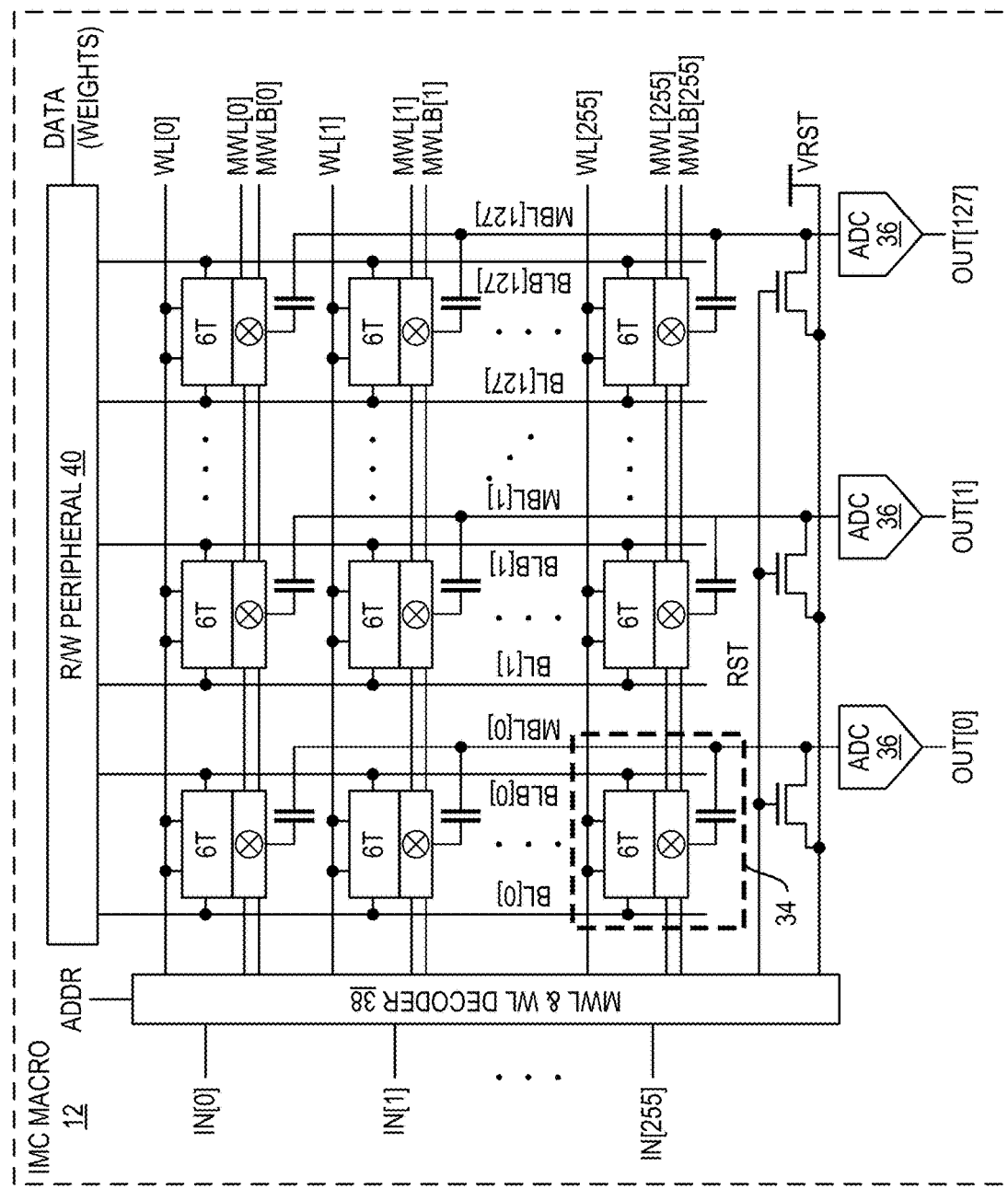
FIG. 2 is a schematic diagram of an in-memory computing (IMC) macro in the PIMCA of FIG. 1.

FIG. 2 is a schematic diagram of an IMC macro 12 in the PIMCA 10 of FIG. 1. The IMC macro 12 is based on the capacitor-coupling computing mechanism, and includes an array of bitcells 34. The binary multiplication result of each bitcell 34 is accumulated over signal lines, which may be referred to as memory-based learners (MBLs) through capacitive coupling. The MBL voltage of each column is converted to multi-bit values by a flash analog-to-digital converter (ADC) 36 for that column. The peripheral circuitry such as decoders 38, flash ADC 36, and read and write (R/W) control 40 is clock-gated to reduce the clock power when the IMC macro 12 is idle.

Figure 3B:
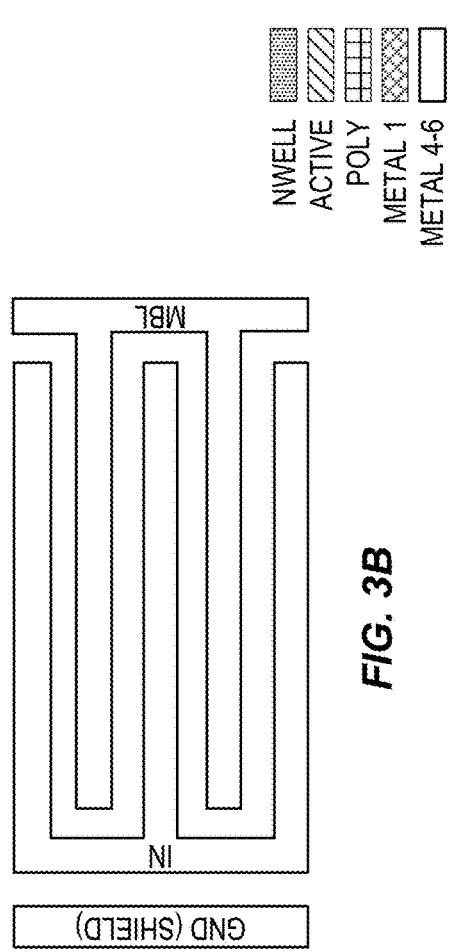
FIG. 3B is a diagram of a metal-oxide-metal (MOM) capacitor on each bitcell of FIG. 3A.
Figure 3C:
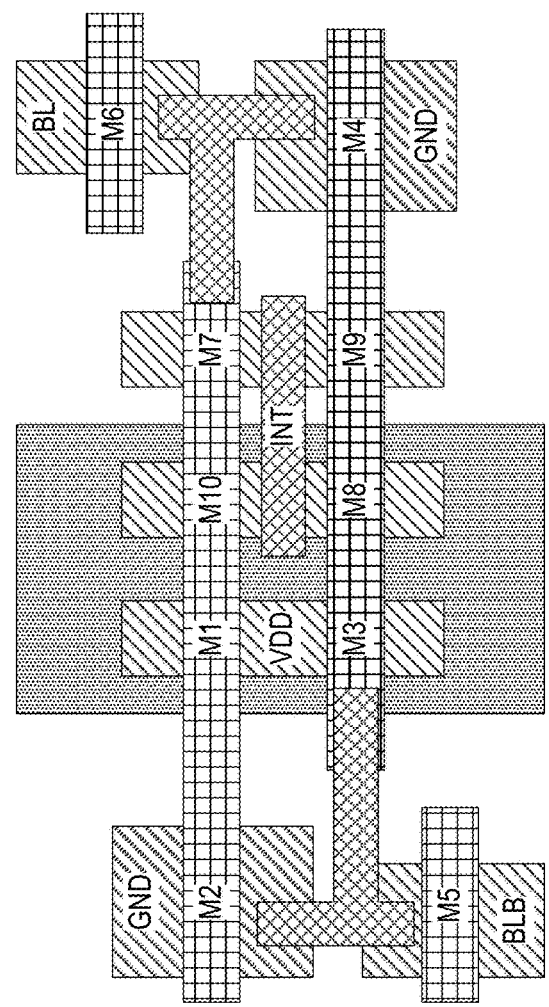
FIG. 3C is a diagram of a semiconductor layout of the bitcell of FIG. 3A.
Figure 3A:
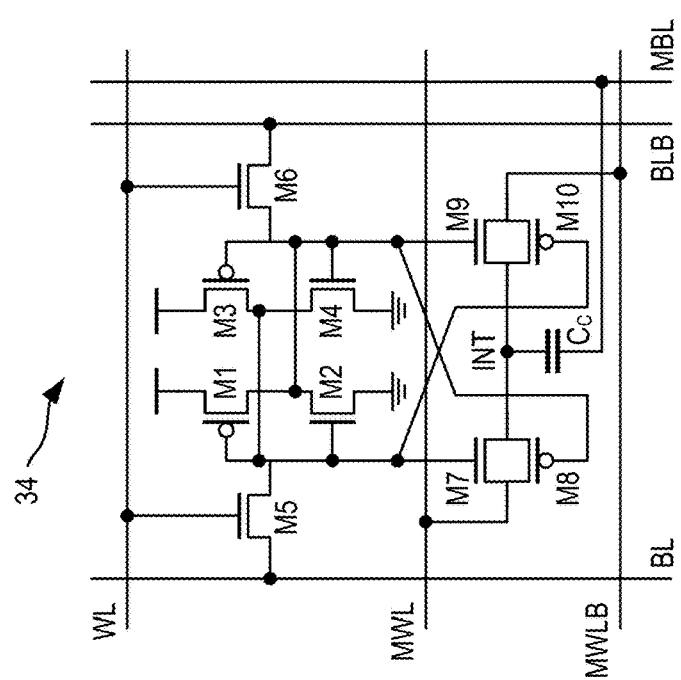
FIG. 3A is a schematic diagram of a bitcell in the IMC macro of FIG. 2.

FIG. 3A is a schematic diagram of a bitcell 34 in the IMC macro 12 of FIG. 2. FIG. 3B is a diagram of a metal-oxide-metal (MOM) capacitor on each bitcell 34 of FIG. 3A. FIG. 3C is a diagram of a semiconductor layout of the bitcell 34 of FIG. 3A. The bitcell 34 of the PIMCA 10 is formed from the addition of two transmission gates (M7 and M8, M9 and M10) and a coupling capacitor $C_c$ to a traditional six-transistor (6T) SRAM bitcell. The coupling capacitor $C_c$ is implemented as an MOM capacitor (M4-M6) on top of the bitcell 34 for area efficiency. The coupling capacitor $C_c$ performs one MVM in a cycle by simultaneously turning on all rows and columns.

In an exemplary embodiment, the SRAM IMC macro 12 contains 256 by 128 bitcells 34 (e.g., a 10T1C cell array). The coupling capacitor $C_c$ is a 2.2 fF capacitor which performs one 256×128 MVM in a cycle by simultaneously turning on all 256 rows and 128 columns. The MBL voltage of each column is converted to 4-b values by an 11-level flash ADC 36. When it performs MAC computation, all of the 256×128 cells will be activated simultaneously and generate 128 column-wise MAC results. In each cycle, each bitcell performs the bit-level multiplication (XNOR) and the result builds a voltage on the INT node of the bitcell (shown in FIG. 3A). This voltage is then coupled to the vertical line, MBL, in each column through the capacitors. The charge will redistribute on the floating MBL and the final voltage change on MBL $\Delta V_{MBL}$ will be proportional to the MAC result.

The final voltage change on MBL $\Delta V_{MBL}$ can be formulated in the steady state after charge coupling as in Equation 1:

$$V_{MBL} = V_{RST} \cdot \left(1 + \frac{C_C}{256 \cdot C_C + C_{par}} \cdot MAC\right) \quad \text{Equation 1}$$

where $V_{RST}$ is the reset voltage of MBL, as shown in FIG. 2. The $C_{par}$ represents the sum of the parasitic capacitor on MBL and the input capacitance of the ADC. Overall, $V_{MBL}$ consists of the DC component, $V_{RST}$, and the MAC-dependent component, the right half in the bracket in Equation 1. The MAC-dependent part acts like a capacitive voltage divider where the output voltage is proportional to the ratio between the capacitor connected to VDD(MAC·$C_C$) and the total capacitance (256·$C_C$+$C_{par}$). The voltages on each of the 128 MBLs will then be converted to a 4-b digital value with a SAR ADCs in every column.

For the coupling capacitor in the bitcell, the MOM capacitor is chosen over the MOS capacitor for computation accuracy and area efficiency. Equation 1 shows that the coupling capacitors ($C_C$) and parasitic capacitors ($C_{par}$) determine the linearity between the MBL voltage and the logic MAC result. The local variations of the parasitic capacitance of MBLs would be averaged out due to the long length of MBLs. Thus, the mismatch of the coupling capacitors becomes the major factor that affects the linearity. Compared to the MOS capacitor, the MOM capacitor has better matching and it is not voltage-dependent, either.

The MOS capacitor version exhibits typically a 2.4× larger standard deviation than the MOM capacitor counterpart. In addition, due to the voltage independence, the MOM capacitor version shows symmetry centered on the zero MAC result. Furthermore, the MOM capacitors can be vertically stacked on top of transistors to save chip area.

C. Pipeline Architecture and ISA

Figure 4A:
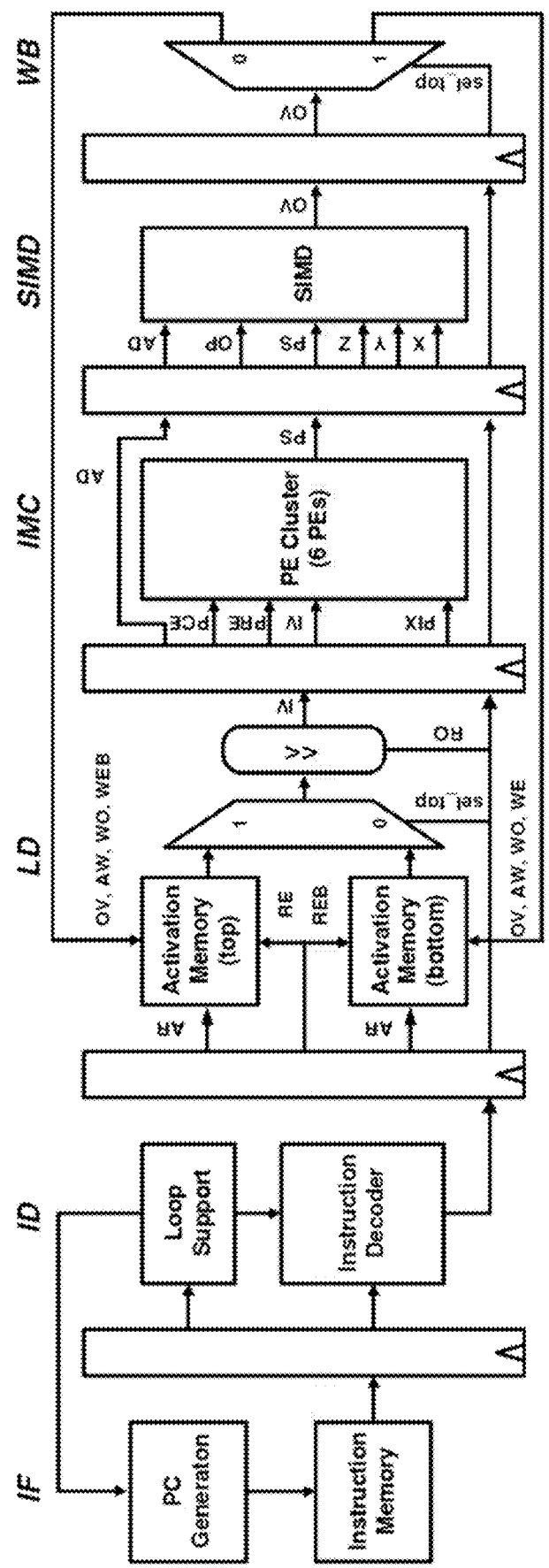
FIG. 4A is a diagram showing an exemplary execution flow of the PIMCA in a six-stage processing element (PE) and single-instruction-multiple-data (SIMD) processor pipeline with hardware loop support included.

FIG. 4A is a diagram showing an exemplary execution flow of the PIMCA 10 in a six-stage IMC PE 14 and SIMD processor 22 pipeline with hardware loop support included. Every cycle, an instruction is fetched from instruction memory (IF) and is then decoded by the instruction decoder with loop support (ID), followed by reading input vectors from the activation memory 24 (LD). With these input vectors, the IMC stage performs the MAC operations (e.g., VMM operations) in one of the size IMC PEs 14. Subsequently, the SIMD stage performs other non-MAC vector operations with the SIMD processor 22. Finally and optionally, the SIMD results are written back to the activation memory 24 (WB).

In an exemplary embodiment, the PIMCA ISA contains 10 72-b instructions and 40 10-b registers. The ISA has four types of instructions: one regular instruction, four loop instructions, three configuration instructions, and two other instructions (Table I). A regular instruction performs MAC operation(s) in the IMC PEs 14 and non-MAC operation(s) in the SIMD processor 22. A loop instruction deals with up to eight levels of generic nested for-loops of a DNN model. A configuration instruction writes the configuration data to registers to configure the pipeline and the two other instructions set the chip to test mode or indicate the end of the program.

TABLE 1

PIMCA Instructions

| Type | Name | Description |
| --- | --- | --- |
| Regular | REGU | PE/SIMD instruction for computation |
| Loop | SOL | Initialize a loop |
| | EOL | Loop end condition check |
| | LAS | Set loop variable for unconditional loop |
| | CLS | Set loop variable for conditional loop |
| Configuration | SRS | Set row size of weights |
| | SMO | Set mapping order |
| | SDM | Set data memory order |
| Others | TST | Enter test mode |
| | EOP | End of program |

The 40 registers are divided into two groups: 16 general-purpose registers (LR[0:15]) and three sets of eight loop support registers (STR[0:7], CTR[0:7] and RPR[0:7]). The STR registers store the loop step sizes, the CTR registers store the loop counters, and the RPR registers store the numbers of loop iterations. If necessary, a programmer can use the first eight regular registers (LR[0:7]) to store additional loop-related parameters.

FIG. 4B illustrates the format of a regular instruction in the custom ISA for the six-stage pipeline of FIG. 4A. The regular instruction consists of five fields, each containing multiple subfields. The first field, "AM Access", has six subfields, which sets the control for reading and writing to the activation memory 24. The MO subfield sets the activation streaming order from activation memory 24 to IMC PE 14 (more details are described in Section II-D). The second field, "PE", determines the configuration of IMC macros 12. Based on the PE field, the PIMCA 10 chooses to activate certain IMC macros 12 inside a certain IMC PE 14 and determines the accumulation mode of the adder tree inside that IMC PE 14. For a 2-b network, the MSB subfield indicates whether the current input is the MSB or LSB, and in a case where weights cannot fill the IMC macros 12, the DUP subfield will fill the rest of the IMC macro 12 with equal +1 s and −1 s to generate zero-sum.

The third field, "SIMD", sets the operands, the operation, and the destination of the SIMD processor 22. Since the SIMD processor 22 contains two lanes, two 1-b enable signals (REN and LEN) control them separately. The "Loop" field defines the repetition time of the current instruction by increasing the address of the operands by 1. The "Type" field determines which the current instruction is among the 10 instructions listed in Table I. For simplicity, an extra 1-b reserved field is not shown in FIG. 4, which is used for the alignment with the loop instructions.

The 6-b loop subfield inside a regular instruction reduces the program size as well as energy consumption. For a regular instruction with its loop subfield equaling to N, it will be executed for N times and the top controller automatically increases the read/write address by one each time when the instruction is repeated. In the DNN inference task, taking convolutional layers as an example, adjacent operations only differ in the read address and write address, and usually these addresses are continuous. Using the loop field to indicate the repetitions instead of writing unique instructions with only address change will greatly reduce the number of instruction counts, leading to a smaller program size. Moreover, since the top controller will automatically increase the address, it can reduce the energy dissipation for instruction fetch and decode. To find the optimum width of the loop field, different widths for VGG-9 and ResNet-18 DNN models were tested. Based on this test, a 68-b loop field gives the minimum program size. By using the 6-b loop subfield, the total instruction count reduces by 5× and the total program size reduces by 3.7×.

FIG. 4C illustrates the format of a for-loop instruction (listed in Table I) in the custom ISA for the six-stage pipeline of FIG. 4A. Each for-loop is enclosed by a pair of loop-setup (SOL) and loop-end-check (EOL) instructions. The SOL instruction initializes the loop with the first three parameters in the "Loop Parameter" field to the registers indexed by LIX in FIG. 4C, i.e., it stores the loop variable initial value (LIN) to register LR[LIX], the loop step size (LST) to register STR[LIX], the loop repeat times (LPR) to RPR [LIX], and it also sets the loop counter, CTR[LIX], to zero. When the matching EOL instruction is reached, the loop variable register will be incremented by the step size, and the loop counter register is increased by 1.

Once the loop counter register value reaches the specified repetition times, the PIMCA 10 will move to the next instruction; otherwise, it jumps to the first instruction of the current loop whose address is defined in the LET subfield of the EOL instruction. In addition to linearly increasing the loop variable by the step size in each iteration, the ISA can also update the loop variable with a scaling factor (LB) and the offset (LC) using the LAS or CLS instruction. These two instructions will fetch the loop variable indexed by the LIXS subfield, multiply it with the scaling factor, and add the offset; the result is stored in the register indexed by LIX.

D. Activation Memory

In an exemplary aspect, the PIMCA 10 integrates 1.54-Mb activation memory 24 using off-the-shelf single-port SRAM for storing input image, intermediate data, batch normalization (BN) parameters, and final outputs. Single-port SRAM was used instead of dual-port SRAM for better area efficiency. However, when pipelining the 6-stage operations of instructions, read and write access of activation memory could take place simultaneously. To avoid read/write conflict, the activation memory 24 is split into two groups: top and bottom. To compute a DNN layer, input data are read from the top (bottom) group, whereas the output data are written back to the bottom (top) group. Each group of the activation memory 24 is further divided into six banks (1024×128 b) to support flexible yet efficient activation memory 24 access with the activation rotator.

Figure 5:
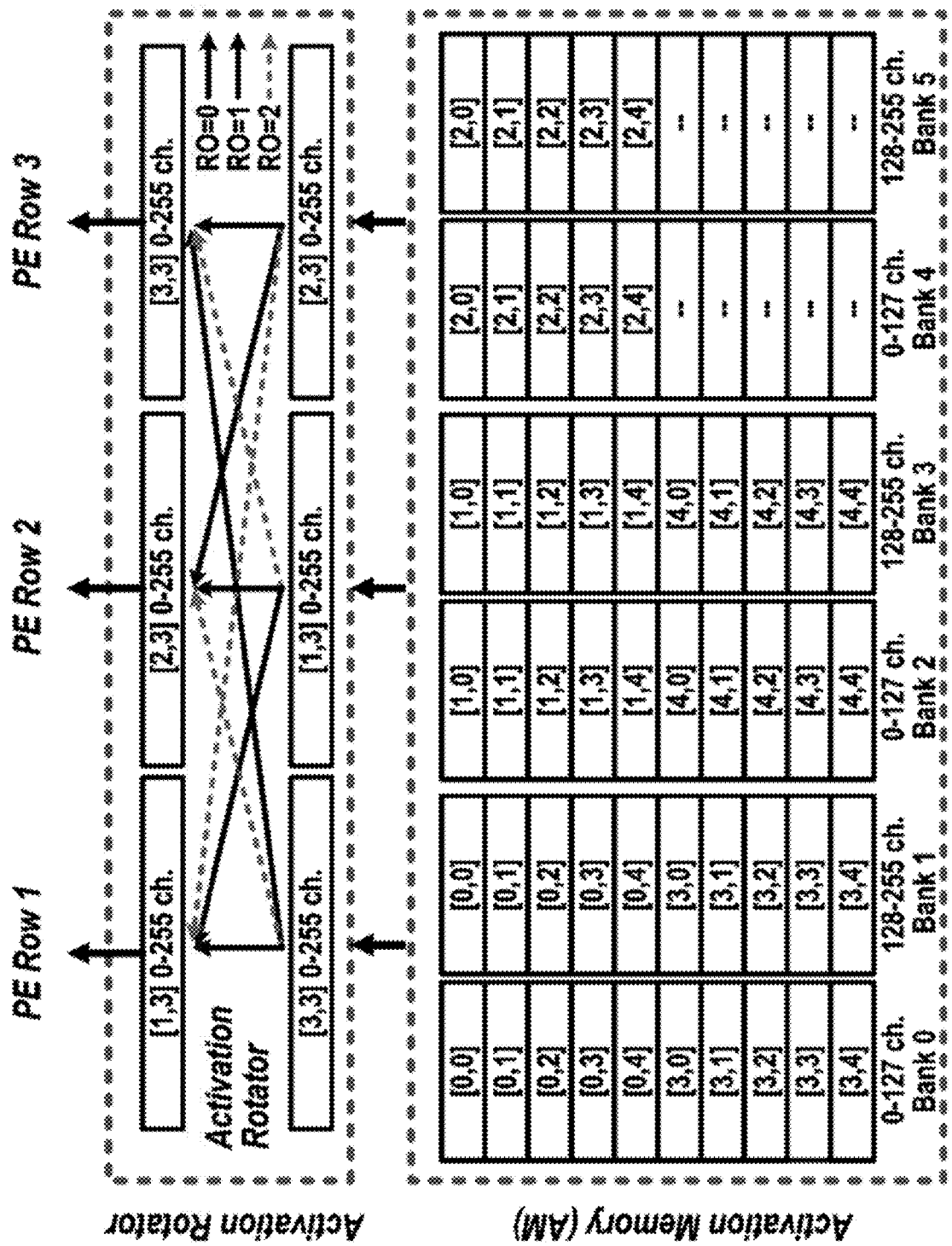
FIG. 5 illustrates an example of how a feature map is stored in one of the activation memory groups and streamed to the IMC PE for a 4×4×256 (height×width×channel) input feature map with 3×3×256 convolution kernels.

FIG. 5 illustrates an example of how a feature map is stored in one of the activation memory 24 groups and streamed to the IMC PE 14 for a 4×4×256 (height×width× channel) input feature map with 3×3×256 convolution kernels. Three consecutive rows of the feature map are stored separately across six different banks, and the ensuing rows follow the same mod-3 storage pattern. In one cycle, the PIMCA 10 only fetches a column of three points in the feature map. For example, in FIG. 5, points with coordinates of [1:3, 3, 0:255] are fetched. When the kernel slides on the feature map, the same feature map points would get calculated with different kernel data which remains stationary in the IMC macros 12 inside IMC PEs 14.

To reduce the data reloading, an activation rotator is used to change the order of accessed data in activation memory 24. Since it is a 3×3 kernel, there will only be three different rotating orders (RO, corresponding to the MO field in the ISA) and the data from the activation memory 24 will be reordered to one of this three ROs according to the control signal and will be sent to the IMC PE 14 for MAC computation. Aided by this activation rotation and similar address generation for different banks, the active IMC PE 14 can access any 3×1×256 input patch in a cycle, simplifying the streaming process by eliminating the need for extra buffering between activation memory 24 and IMC PE 14.

E. PE and PE Cluster

The PE cluster contains multiple IMC PEs 14 (e.g., six IMC PEs 14), and each IMC PE 14 contains 18 IMC macros 12 with two configurable adder trees. The two adder trees accumulate the outputs of the 18 IMC macros 12 in one IMC PE 14. With a configurable IMC PE 14 design, the PIMCA 10, can flexibly map the IMC macros 12 to support multiple convolution kernel sizes, such as three typical convolution kernel sizes (3×3, 5×5, and 1×1), different bit-widths (e.g., 1-b and 2-b), and efficient zero padding in convolution layers.

Figure 6A:
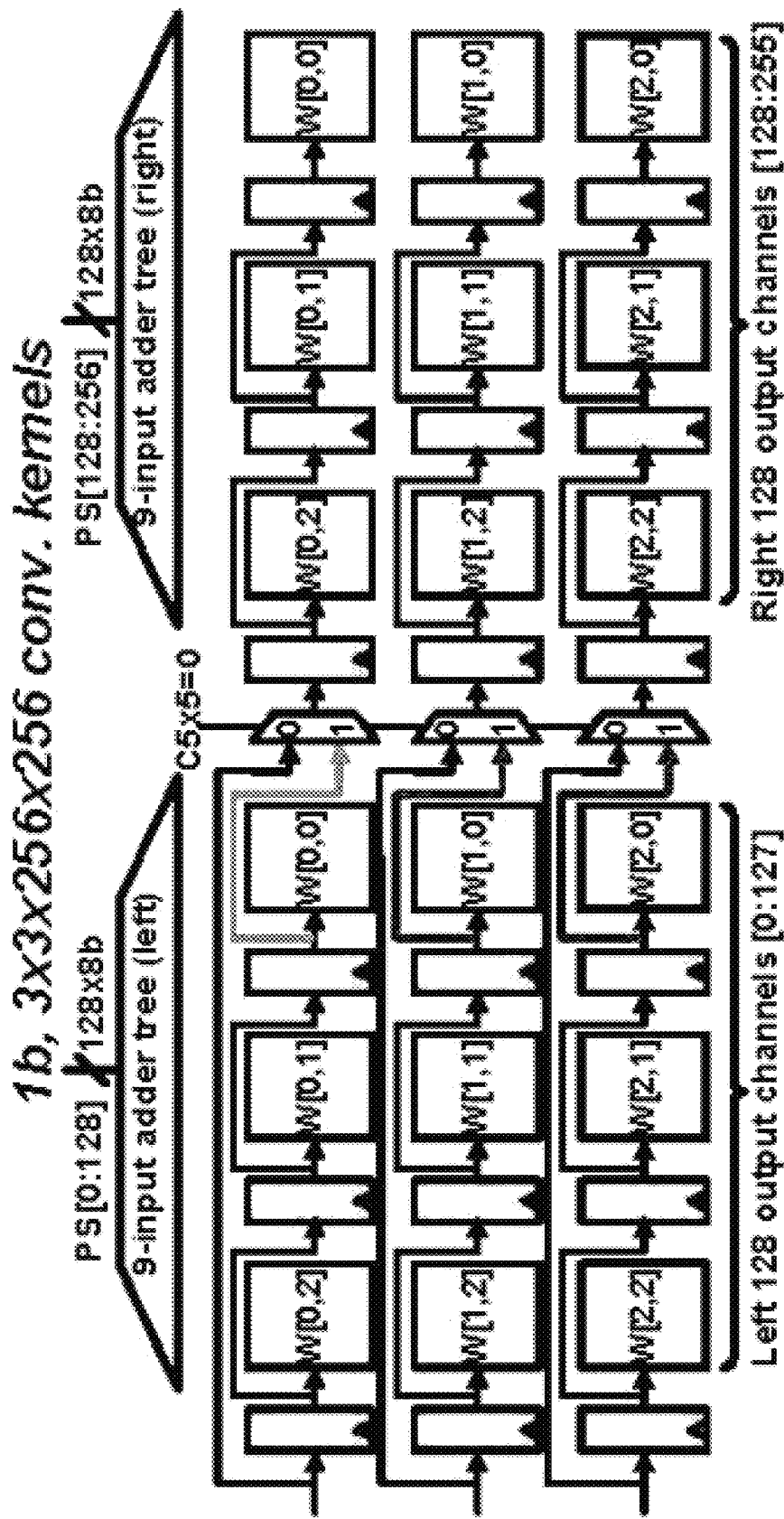
FIG. 6A is a diagram showing an IMC macro mapping for 1-b 3×3 convolution kernels.
Figure 6B:
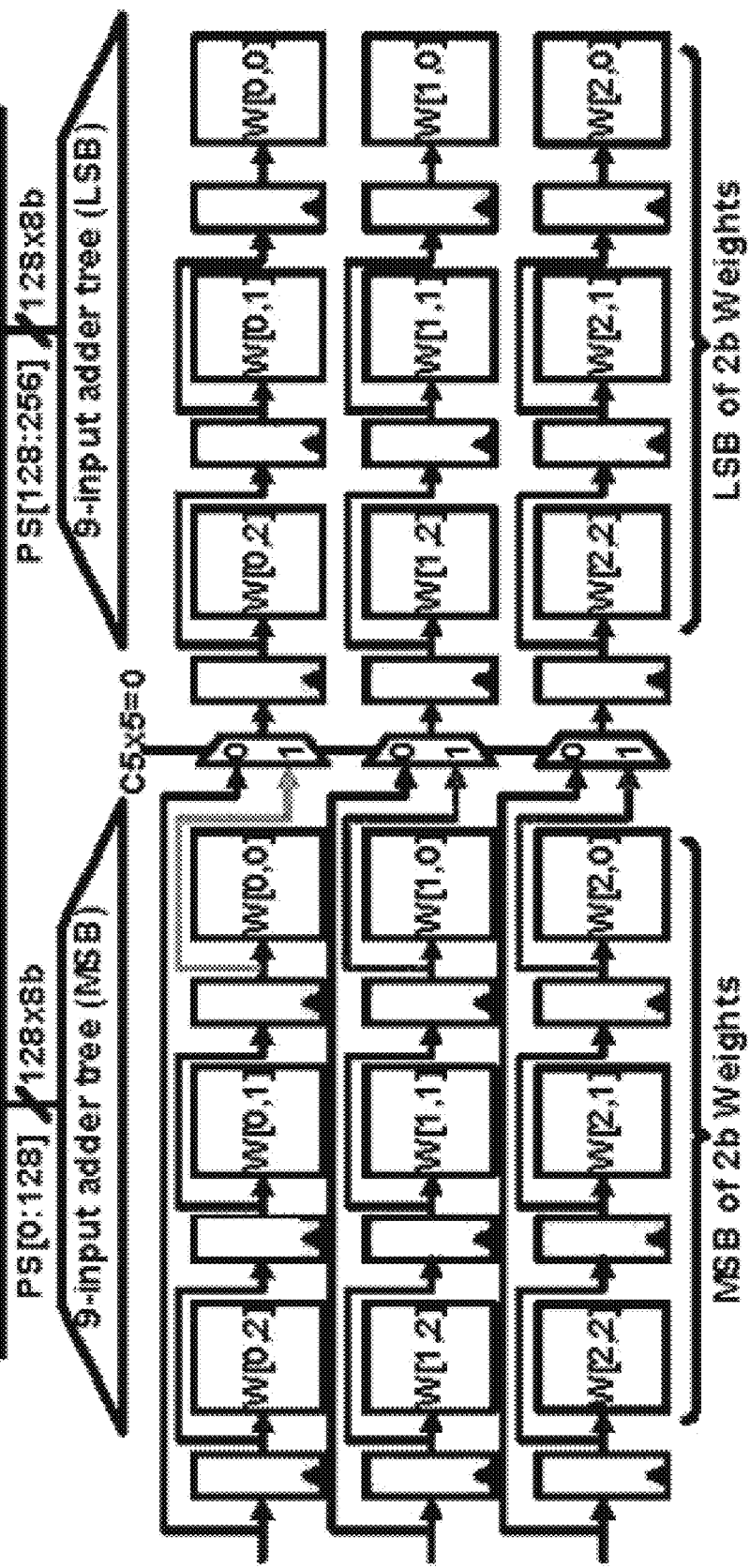
FIG. 6B is a diagram showing an IMC macro mapping for 2-b 3×3 convolution kernels.

FIG. 6A is a diagram showing an IMC macro 12 mapping for 1-b 3×3 convolution kernels. FIG. 6B is a diagram showing an IMC macro 12 mapping for 2-b 3×3 convolution kernels. The 1-b or 2-b kernels of a 256×256 or 256×128 (input channels×output channels) convolution layer can be mapped in that IMC PE 14, as shown in FIGS. 6A and 6B. The left and right groups share the input vectors. The input registers for the 3×3 macro group are pipelined horizontally, exploiting the convolutional data reuse. For the 2-b neural network (FIG. 6B), the left 9 IMC macros 12 store the MSB of the weight while the right 9 macros store the LSB. A special register unit is designed to buffer the MSB and LSB of the input. It contains two multiplexers and two registers for MSB and LSB separately, and the LSB branch is inactive in the 1-b neural network.

Figure 6C:
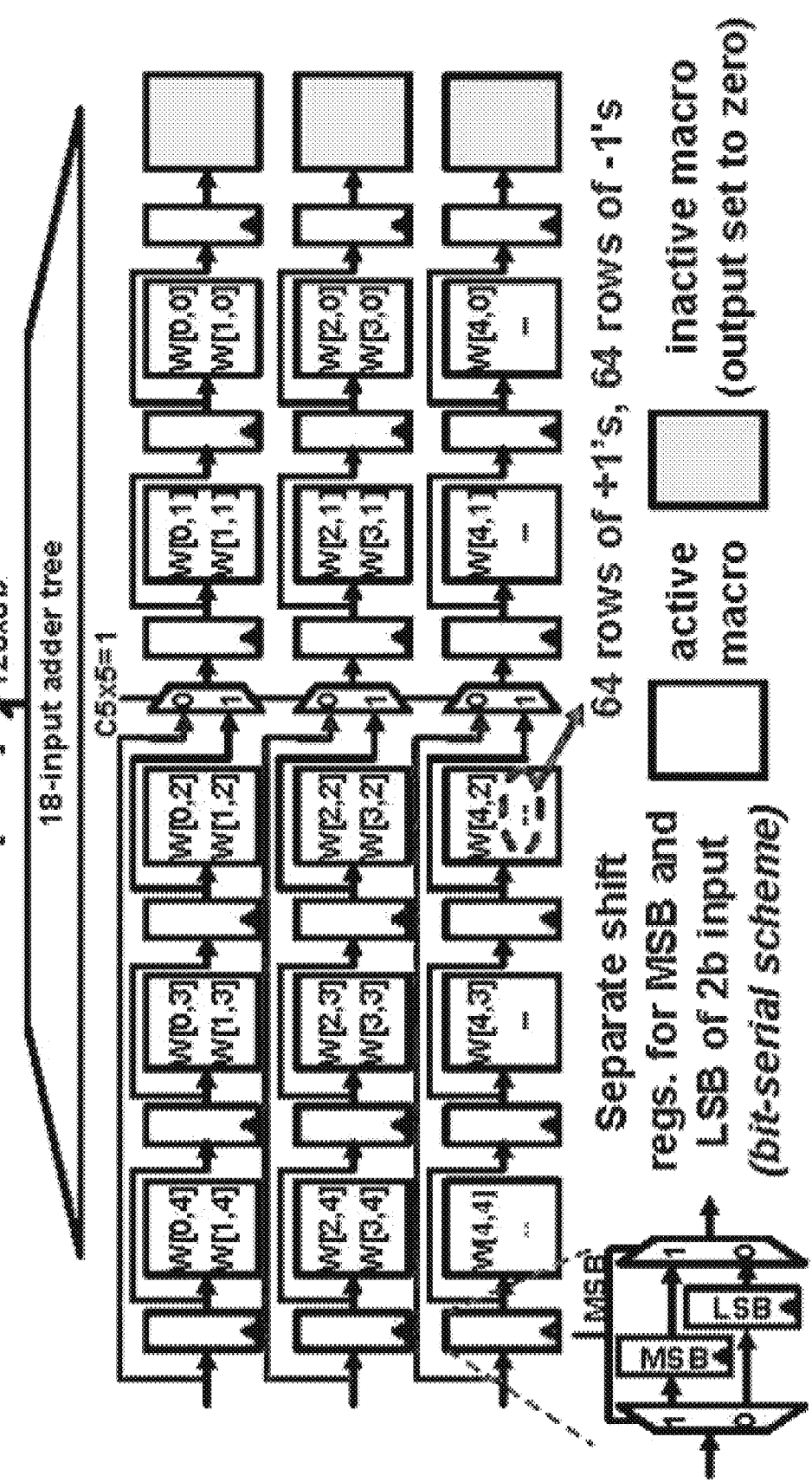
FIG. 6C is a diagram showing an IMC macro mapping for 1-b 5×5 convolutional kernels.

FIG. 6C is a diagram showing an IMC macro 12 mapping for 1-b 5×5 convolutional kernels. Also, 5×5 1-b convolution kernels of a 128×128 can be mapped by connecting the output of input registers of the left group to the input of the right group, as shown in FIG. 6C.

Figure 6D:
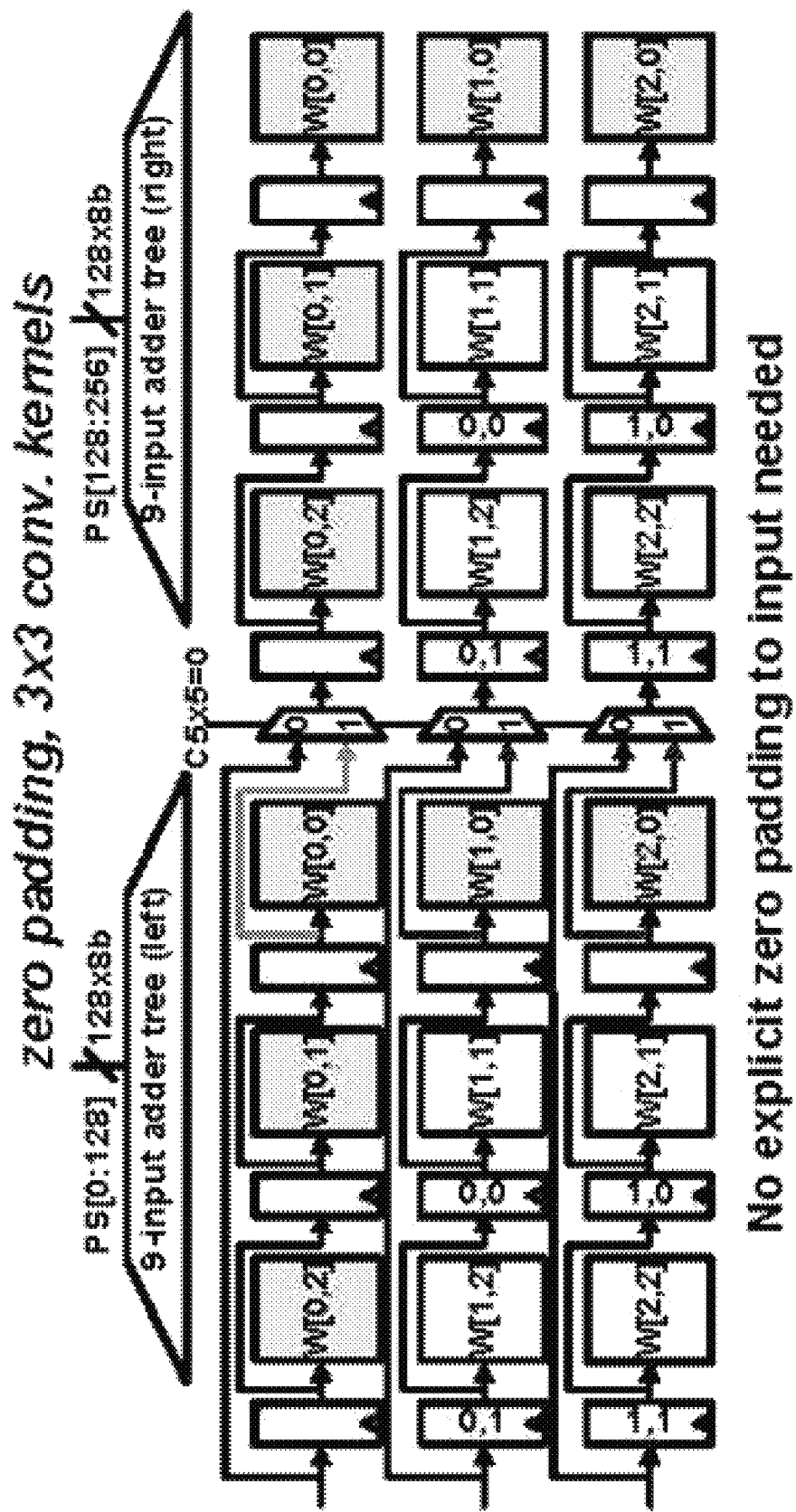
FIG. 6D is a diagram showing IMC macro 12 disabling for implicit zero padding.

FIG. 6D is a diagram showing IMC macro 12 disabling for implicit zero padding. To deal with common zero padding in convolution layers, instead of writing zero weights in the IMC macro 12 and performing idle operations, the surrounding IMC macros 12 are deactivated and their output set to be zero. This eliminates the computing power of the deactivated IMC macros 12 and zeros do not need to be explicitly added to the input feature map.

Besides the convolution layers in DNNs, the IMC PE 14 architecture also supports the fully-connected (FC) layers whose basic computation is also a MAC operation. Similar to FIGS. 6A and 6B, the fully connected layer weights are placed inside the IMC macros 12 the same way as their logical indexes. Equal +1 or −1 padding may be required to fit the size of the macro, and the two adders results are accumulated.

F. SIMD Processor

The 256-way SIMD processor 22 performs non-MAC computing acceleration. The SIMD processor 22 can be implemented as a processor which directly uses the output of the selected IMC PE 14 or fetches data from activation memory 24. Each way of the SIMD processor 22 contains four 8-b registers (R0-R3) and a 10-b register (R4). The most significant bits of R4 of the 256 ways are taken as the output of the SIMD processor 22 (binarization).

Among the eight operations that the SIMD processor 22 supports, ADD2 is special in that it multiplies the left 128 ways by 2 and then adds with the right 128 ways, to support the binary weighting of 2-b weight precision, shown in FIG. 6C, while other operations (ADD, LOAD, MAX, CMP, CMP2, RSHIFT, LSHIFT) perform element-wise computations as in a conventional SIMD processor. Cellular multi-processing (CMP) and CMP2 are for performing a user-defined activation. CMP (CMP2) uses one (three)

threshold(s) to produce a 1-b (2-b) result. RSHIFT (LSHIFT) performs right (left) bit shifting.

III. PROCESS FOR DISTRIBUTING DNN COMPUTATIONS

Figure 7:
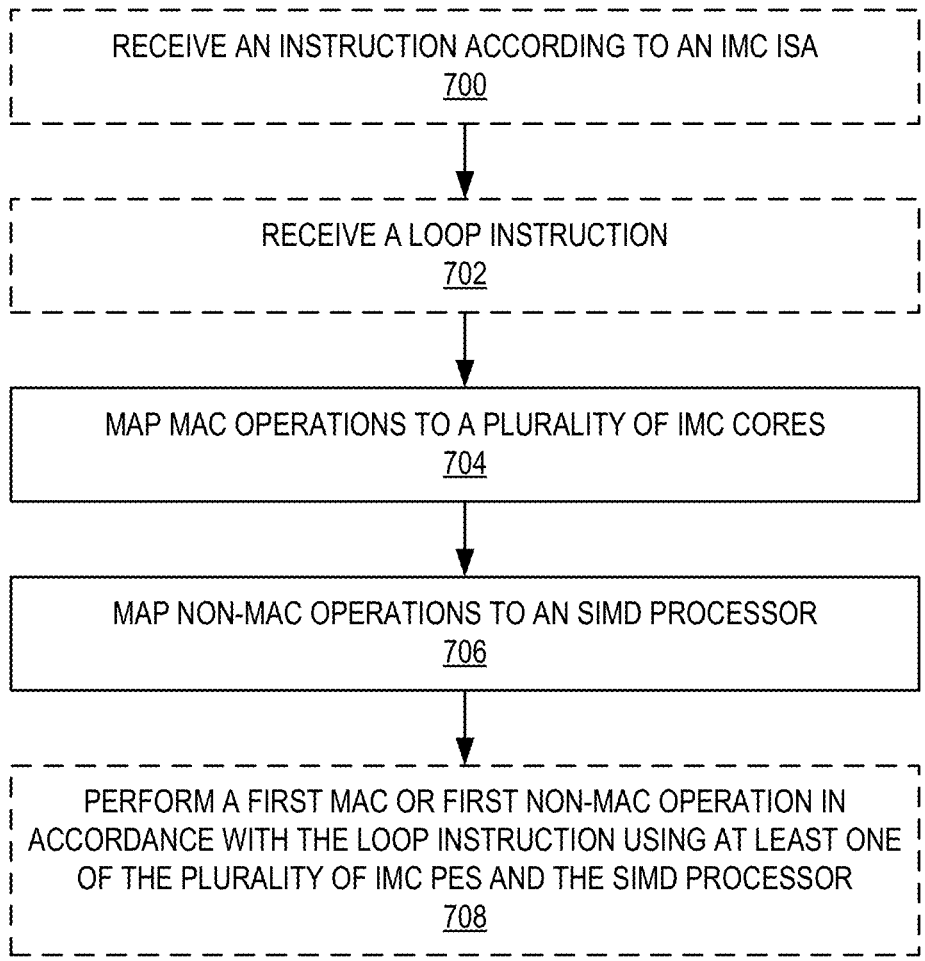
FIG. 7 is a flow diagram illustrating a process for distributing computations of deep neural networks (DNNs) in an accelerator.

FIG. 7 is a flow diagram illustrating a process for distributing computations of DNNs in an accelerator. Dashed boxes represent optional operations. The process optionally begins at operation 700, with receiving an instruction according to an IMC ISA. In an exemplary aspect, the instruction is a regular instruction according to the IMC ISA, which includes R/W addresses, IMC PE and IMC macro selection and accumulation mode control, and SIMD operands and SIMD operation code. The process optionally continues at operation 702, with receiving a loop instruction (e.g., in addition to or as part of the regular instruction).

The process continues at operation 704, with mapping MAC operations to a plurality of IMC PEs. The process continues at operation 706, with mapping non-MAC operations to an SIMD processor. The process optionally continues at operation 708, with performing a first MAC or first non-MAC operation in accordance with the loop instruction using at least one of the plurality of IMC PEs and the SIMD processor.

Although the operations of FIG. 7 are illustrated in a series, this is for illustrative purposes and the operations are not necessarily order dependent. Some operations may be performed in a different order than that presented. Further, processes within the scope of this disclosure may include fewer or more steps than those illustrated in FIG. 7.

IV. CONCLUSION

Several novel technologies are provided herein. In a first aspect, a new architecture for a programmable large-scale hardware accelerator based on many (e.g., >100, such as 108) IMC macros 10 is provided. The IMC macros 10 are divided into a small number of IMC PEs 14 (e.g., 6), where each IMC PE 14 has a medium number of IMC macros 10 (e.g., 18). All IMC macros 10 in each IMC PE 14 run in parallel, while different IMC PEs 14 can run serially (e.g., DNN layer-by-layer) or in parallel. Each IMC PE 14 can support various kernel sizes, such as 3×3, 5×5, and 1×1.

For 3×3 kernels, the 3×6 macros are split into two 3×3 groups, and a 1-bit convolution layer of 256×256 input and output channels or 2-b of 256×128 can be mapped in an IMC PE 14 (see FIGS. 6A and 6B). Within each IMC PE 14, the input activations are pipelined horizontally (from left to right), exploiting the convolutional data reuse (same weights convolved with different inputs), since the two 3×3 share the input activation vectors. For 5×5 kernels, a 1-bit convolution layer of 128×128 can be mapped by connecting the output of input registers of the left group to the input of the right group (see FIG. 6C).

Zero-padding is used frequently for convolution operations in DNNs. For zero padded inputs, the corresponding IMC macros are disabled, therefore IMC computation energy can be effectively saved (see FIG. 6D). 1-bit DNN or 2-bit DNN can both be flexibly mapped onto the IMC PE 14 structure.

In a second aspect, a technology to distribute various computations of DNNs onto a large number of instances of IMC macros and digital computation modules is provided. In DNNs, there are MAC operations (typically >90% of operations) and non-MAC operations. MAC operations are mapped to the IMC macros 12/IMC PEs 14, and non-MAC operations to the custom SIMD processor 22 described herein.

A 256-way SIMD processor performs all non-MAC computations. It supports eight types of operations: 'LOAD' offers data transfer; 'ADD' performs partial sum addition (Z=X+Y); 'ADD2' performs shift-and-add (Z=2X+Y), which efficiently supports i) bit-serial scheme for 2-bit input (X and Y from the same SIMD lane) and ii) bit-parallel scheme for 2-bit weight (X/Y from left/right lanes); 'CMP' and 'CMP2' do comparison (Z=(X>Y)) for computing 1-bit and 2-bit activation results; 'MAX' selects the maximum value during max-pooling; 'LSHIFT'/'RSHIFT' shift data left/right, critical to support simple multiplication/division.

In a third aspect, a new ISA for IMC-based hardware accelerator is provided. A method using the proposed custom ISA to effectively reduce instruction count and latency for deep learning workloads using the IMC-based programmable accelerator is further provided. In DNNs, there are many repetitive types of operations, thus hardware loop support is critical for scaling instruction-related overhead, but many prior IMC works do not have such loop support. A regular instruction (see FIG. 4B) performs MAC/non-MAC computation. It contains three major fields: i) read and write (R/W) addresses and AM enable, ii) IMC PE 14 and IMC macro 12 selection and accumulation mode control, and iii) SIMD operands and SIMD operation code. For loop support, each regular instruction contains a 6-bit field that defines repetitions (up to 64).

To support generic for-loops, the ISA has loop instructions; the loop-setup (LS) instruction and loop-end-check (LE) instruction can define up to eight levels of nested for-loops by setting special loop registers and counters (LR, LC). For the case of 1-bit VGG-9 DNN inference, exploiting the repetitive computation types, the proposed hardware loop support reduces the total instruction count by 4×.

Those skilled in the art will recognize improvements and modifications to the preferred embodiments of the present disclosure. All such improvements and modifications are considered within the scope of the concepts disclosed herein and the claims that follow.

What is claimed is:
1. A programmable large-scale hardware accelerator, comprising:
an activation memory;
a single-instruction-multiple-data (SIMD) processor; and
a plurality of in-memory computing (IMC) processing elements (PEs) capable of performing deep neural network inference operations at least one of serially or in parallel, each IMC PE comprising a set of IMC macros in a two-dimensional arrangement configured to run in parallel,
the accelerator being configured to execute an instruction, the executing comprising:
executing a first portion of the instruction by at least one IMC PE of the plurality of IMC PEs, the first portion comprising a multiplication-and-add (MAC) operation; and
executing a second portion of the instruction by the SIMD processor, the second portion comprising a non-MAC operation,
wherein:
the IMC PE is capable of supporting a plurality of convolution kernel sizes;
the IMC PE comprises an adder for accumulating results from the set of MC macros;

an IMC macro of the set of IMC macros of the IMC PE comprises a plurality of static-random-access-memory (SRAM) bitcells arranged in a plurality of columns;

the IMC macro comprises a signal line, the signal line being:
 capacitively coupled to bitcells in a column of the plurality of columns, and
 configured to accumulate a MAC result of bitcells in the column;

the IMC macro includes a flash analog-to-digital converter to convert the accumulated MAC result to a multi-bit digital value; and the instruction comprises:
 a read address,
 a write address,
 an IMC PE selection,
 an IMC macro selection,
 one or more SIMD operands, and
 a SIMD operation code.

2. The programmable large-scale hardware accelerator of claim 1, wherein each IMC PE can support convolution kernel sizes of 3×3, 5×5, and 1×1.

3. The programmable large-scale hardware accelerator of claim 1, wherein a 1-bit deep neural network (DNN) or 2-bit DNN can be mapped to the plurality of IMC PEs.

4. The programmable large-scale hardware accelerator of claim 1, wherein each IMC PE comprises eighteen IMC macros.

5. The programmable large-scale hardware accelerator of claim 4, wherein:
 the plurality of IMC PEs comprises 6 IMC PEs; and
 108 IMC macros are divided among the 6 IMC PEs.

6. The programmable large-scale hardware accelerator of claim 4, further comprising a memory storing instructions which, when executed, cause the programmable large-scale hardware accelerator to, for a 3×3 convolution kernel size, divide the set of IMC macros in a first IMC PE of the plurality of IMC PEs into two 3×3 groups.

7. The programmable large-scale hardware accelerator of claim 6, wherein the memory further stores instructions which, when executed, cause the programmable large-scale hardware accelerator to map a 1-bit convolution layer or a 2-bit convolution layer in the first IMC PE.

8. The programmable large-scale hardware accelerator of claim 4, further comprising a memory storing instructions which, when executed, cause the programmable large-scale hardware accelerator to, for a 5×5 convolution kernel size, map a 1-bit convolution layer by connecting input registers together in one of the plurality of IMC PEs.

9. The programmable large-scale hardware accelerator of claim 1, wherein when a zero-padded input is received by one of the plurality of IMC PEs, a corresponding portion of the set of IMC macros is disabled.

* * * * *